United States Patent
Choi

(10) Patent No.: US 9,630,459 B2
(45) Date of Patent: Apr. 25, 2017

(54) APPARATUS AND METHOD FOR MONITORING VEHICLE TIRE PRESSURE

(71) Applicant: HYUNDAI MOTOR COMPANY, Seoul (KR)

(72) Inventor: Moo Ryong Choi, Incheon (KR)

(73) Assignee: HYUNDAI MOTOR COMPANY, Seoul (KR)

(*) Notice: Subject to any disclaimer, the term of this patent is extended or adjusted under 35 U.S.C. 154(b) by 0 days.

(21) Appl. No.: 14/874,018

(22) Filed: Oct. 2, 2015

(65) Prior Publication Data

US 2016/0347134 A1    Dec. 1, 2016

(30) Foreign Application Priority Data

May 29, 2015    (KR) .................. 10-2015-0076150

(51) Int. Cl.
     *B60C 23/04*      (2006.01)
     *G01L 5/00*      (2006.01)
     *G01L 17/00*      (2006.01)

(52) U.S. Cl.
     CPC ............ *B60C 23/0488* (2013.01); *G01L 5/00* (2013.01); *G01L 17/00* (2013.01)

(58) Field of Classification Search
     CPC ........ B60C 23/0488; G01L 5/00; G01L 17/00
     USPC ....................................................... 701/34.3
     See application file for complete search history.

(56) References Cited

U.S. PATENT DOCUMENTS 5,583,483 A * 12/1996 Baumann .............. B60C 23/061
     340/432
5,913,241 A    6/1999 Ohashi et al.

FOREIGN PATENT DOCUMENTS

| CN | 101973192 B | * | 1/2013 |
|---|---|---|---|
| JP | 3300601 B2 | | 7/2002 |
| KR | 10-1999-019824 A | | 3/1999 |
| KR | 10-2000-0055765 A | | 9/2000 |
| KR | 10-2012-0101790 A | | 9/2012 |

OTHER PUBLICATIONS

Machine Translation of CN 101973192 published Jan. 2013.*
Choi, M. et al., "Linearized Recursive Least Squares Methods for Real-Time Identification of Tire-Road Friction Coefficient", IEEE Transactions on Vehicular Technology, vol. 62, No. 7, Sep. 2013, 2906-2918.

* cited by examiner

*Primary Examiner* — Anne M Antonucci
(74) *Attorney, Agent, or Firm* — McDermott Will & Emery LLP

(57) ABSTRACT

An apparatus for monitoring a tire pressure of a vehicle includes a cornering force estimator configured to estimate a cornering force of a tire using inertial information and steering information of the vehicle, a pneumatic trail calculator configured to calculate a pneumatic trail using the cornering force and the steering information, and a tire pressure checker configured to determine whether the tire pressure is insufficient based on the pneumatic trail calculated by the pneumatic trail calculator.

7 Claims, 2 Drawing Sheets

APPARATUS AND METHOD FOR MONITORING VEHICLE TIRE PRESSURE

CROSS-REFERENCE TO RELATED APPLICATION

This application claims the benefit of priority to Korean Patent Application No. 10-2015-0076150, filed on May 29, 2015 with the Korean Intellectual Property Office, the disclosure of which is incorporated herein in its entirety by reference.

TECHNICAL FIELD

The present disclosure relates to an apparatus and a method for monitoring a tire pressure of a vehicle using sensor information from a motor driven power steering (MDPS) and a vehicle dynamic control (VDC).

BACKGROUND

When a vehicle is driving with insufficient tire pressure, fuel efficiency and driving stability may be reduced, and a tire may become damaged while the vehicle is driving at a high speed over a long period of time. The installation of a tire pressure monitoring system (TPMS), which outputs a warning message to a driver when the tire pressure is insufficient, is now common.

Existing tire pressure monitoring systems include a pressure sensor and a wireless module inside in the tire. The wireless module transfers a tire pressure state to a receiver apparatus inside the vehicle in real time. To perform the above operation, the wireless module requires a battery inside the tire. The wireless module is expensive and the tire needs to be disassembled to replace the battery of the wireless module every 60,000 km regardless of the tire wear.

An indirect type pressure measuring schemes can also be used. In the indirect type measuring scheme, a natural frequency of a tire can be found using a speed sensor of a wheel. The method may give unsatisfactory results based on the age condition of the tire. Therefore the direct type measuring scheme, in which an air pressure sensor is included in the wireless module installed inside the tire, has been used in most vehicles.

SUMMARY

The present disclosure has been made to solve the above-mentioned problems occurring in the prior art while advantages achieved by the prior art are maintained intact.

An aspect of the present disclosure provides an apparatus and a method for monitoring a tire pressure of a vehicle using sensor information of a motor driven power steering (MDPS) and a vehicle dynamic control (VDC).

According to an exemplary embodiment of the present disclosure, an apparatus for monitoring a tire pressure of a vehicle includes: a cornering force estimator configured to estimate a cornering force of a tire using inertial information and steering information of the vehicle; a pneumatic trail calculator configured to calculate a pneumatic trail using the cornering force and the steering information; and a tire pressure checker configured to determine whether the tire pressure is insufficient based on the pneumatic trail calculated by the pneumatic trail calculator.

The inertial information may include a lateral acceleration and a yaw rate of the vehicle which are measured by a sensor installed in a vehicle dynamic control.

The steering information may include a steering wheel angle and a steering torque which are measured by a sensor installed in the steering apparatus.

The tire pressure checker may determine the tire pressure to be insufficient when the calculated pneumatic trail is less than a reference value.

The reference value may be a pneumatic trail when it is a reference tire pressure.

The apparatus may further include: an output configured to output a warning informing the lack of the tire pressure.

According to another exemplary embodiment of the present disclosure, a method for monitoring a tire pressure of a vehicle includes: estimating a cornering force of a tire using inertial information and steering information of the vehicle; calculating a pneumatic trail using the cornering force and the steering information; and determining whether the tire pressure is insufficient based on the pneumatic trail calculated by the pneumatic trail calculator.

The inertial information may include a lateral acceleration and a yaw rate of the vehicle which are measured by a sensor installed in a vehicle dynamic control.

The steering information may include a steering wheel angle and a steering torque which are measured by a sensor installed in the steering apparatus.

The determining whether the tire pressure is insufficient may include: confirming whether the calculated pneumatic trail is less than a reference value; and determining the tire pressure to be insufficient when the calculated pneumatic trail is less than the reference value.

The determining whether the tire pressure is insufficient may further include determining the tire pressure to be normal when the calculated pneumatic trail is equal to or more than the reference value.

The reference value may be a pneumatic trail when it is a reference tire pressure.

The determining whether the tire pressure is insufficient may further include outputting a warning informing of an insufficient tire pressure.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, exemplary embodiments of the present disclosure will be described with reference to the accompanying drawings.

The present disclosure relates to an indirect type method for estimating a tire pressure. Unlike the existing method for indirectly estimating a tire pressure using only wheel speed data, the present disclosure estimates a tire pressure using sensor information from a motor driven power steering (MDPS) and a vehicle dynamic control (VDC) in addition to the wheel speed of the vehicle. Therefore, the present disclosure may accurately estimate the tire pressure regardless of tire condition, and may not need to be installed in a new tire.

Figure 1:
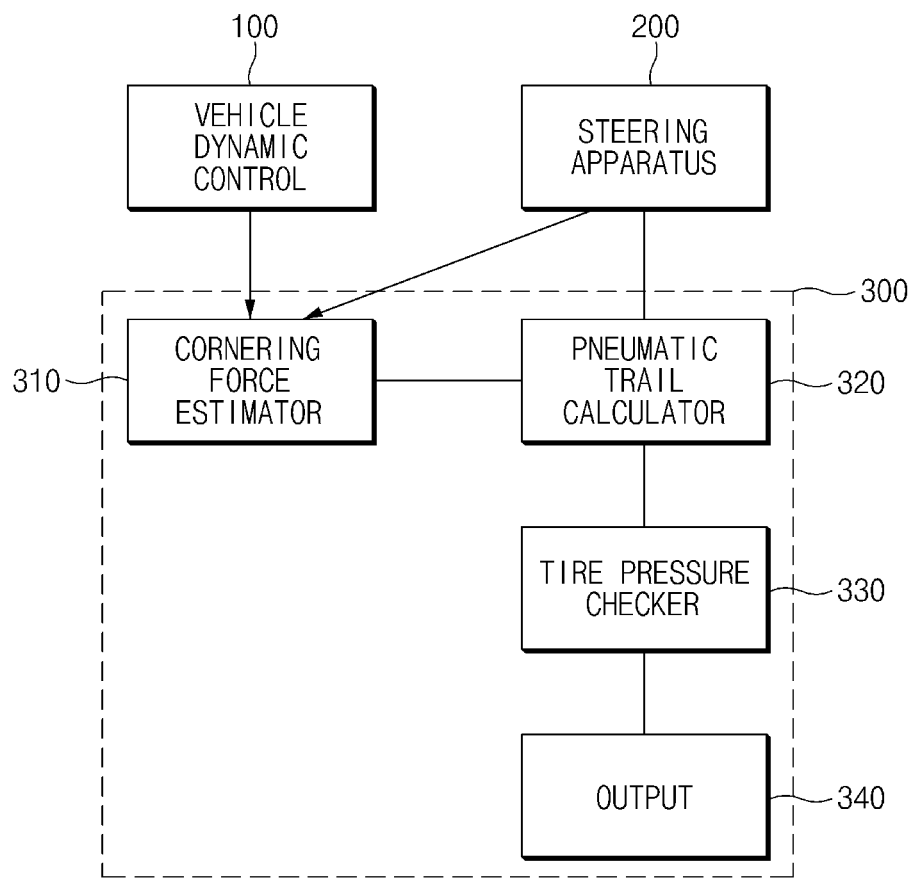
FIG. 1 is a block configuration diagram of a system for monitoring a tire pressure of a vehicle according to an exemplary embodiment of the present disclosure.

FIG. 1 is a block configuration diagram of a system for monitoring a tire pressure of a vehicle according to an exemplary embodiment of the present disclosure.

As illustrated in FIG. 1, the system for monitoring a tire pressure of a vehicle may include a vehicle dynamic control (VDC) 100, a steering apparatus 200 and an apparatus 300 for monitoring a tire pressure. The apparatus 300 for monitoring a tire pressure transmits and receives data to and from the vehicle dynamic control 100 and the steering apparatus 200 through a vehicle network. A vehicle network is implemented as a controller area network (CAN), a media oriented systems transport (MOST) network or a local interconnect network (LIN).

The vehicle dynamic control 100 includes a lateral acceleration sensor and a yaw rate sensor which measure inertial information of a vehicle. The inertial information includes the lateral acceleration and the yaw rate of the vehicle. The vehicle dynamic control 100 transmits the lateral acceleration and the yaw rate measured by the sensor to the apparatus 300 for monitoring a tire pressure.

The steering apparatus 200 provides steering information including a steering wheel angle and a steering torque, which are sensed by a sensor connected to the steering wheel, to the apparatus 300 for monitoring a tire pressure. The steering apparatus 200 is implemented as a motor driven power steering (MDPS).

The apparatus 300 for monitoring a tire pressure monitors a tire pressure of a vehicle and includes a cornering force estimator 310, a pneumatic trail calculator 320, a tire pressure checker 330 and an output 340.

The cornering force estimator 310 calculates a cornering force of the tire.

The cornering force is generated in the tire when the vehicle is pivoted. Therefore, the cornering force is generated less from a rotating center of the tire than from a product of a distance between a rotating center and a cornering force applying point of the tire. In this case, the aligning moment may be represented by the following [Equation 1].

$$\tau_a = F_y E(t_p + t_m)$$ [Equation 1]

In the above Equation 1, $F_y$ represents the cornering force, $t_p$ and $t_m$ represents the distance from the rotating center of the tire to the cornering force applying point. $t_m$ represents a mechanical trail generated by a suspension geometry including a caster angle. $t_p$ represents the pneumatic trail which represents the distance between the center of the tire and the cornering force applying point when a force applied to a surface of the tire is distributed in a triangular form depending on the tire pressure and a strain of rubber at the time of the generation of the cornering force of the tire by a slip angle. A size of the pneumatic trail is proportional to a size of a contact patch of the tire, and the size of the contact patch is increased when the tire pressure is reduced. The present disclosure may monitor the pneumatic trail in real time using this principle to sense whether the current tire pressure is reduced.

The aligning moment and a jacking torque are applied to a steering column from the outside of the vehicle while the vehicle is driving. The jacking torque is a torque applied to the steering column depending on a suspension structure even when the vehicle is stopping, regardless of the cornering force, and may be represented by a function of a steering angle.

The steering apparatus 200 is mounted with the torque sensor which may measure the size of the moment applied to the steering column. The steering torque $\tau_s$ measured by the sensor may be represented by the following [Equation 2].

$$\tau_s = \tau_a + \tau_j$$ [Equation 2]

In the above Equation 2, the jacking torque $\tau_j$ is determined by the suspension geometry like the mechanical trail and therefore may be obtained experimentally. The pneumatic trail in proportion to the length of the contact patch of the tire in a close connection with the tire pressure may be reversely calculated by obtaining only the cornering force.

As a part of the method for estimating a cornering force of a vehicle, a method for estimating a cornering force using a Kalman filter may be used. The method (linearized recursive least squares methods for real-time identification of tire-road friction coefficient, IEEE TRANSACTIONS ON VEHICULAR TECHNOLOGY, VOL. 62, NO. 7, SEPTEMBER 2013) for estimating a cornering force using a Kalman filter configures a vehicle model using vehicle parameters, performs discretization on the vehicle model, and then applies a Kalman filter algorithm to estimate the cornering force of the tire.

The pneumatic trail calculator 320 calculates the pneumatic trail using the cornering force output from the cornering force estimator 310 and the steering torque provided from the steering apparatus 200.

The tire pressure checker 330 confirms whether the pneumatic trail is less than a reference value. In this case, the reference value is the pneumatic trail when the pneumatic trail is a reference tire pressure.

The tire pressure checker 330 determines the tire pressure to be insufficient when the pneumatic trail is less than the reference value. Meanwhile, the tire pressure checker 330 determines the tire pressure to be normal when the pneumatic trail is equal to or more than the reference value.

The output 340 outputs a warning informing of an insufficient tire pressure depending on the control of the tire pressure checker 330. The output 340 outputs a warning that may comprise visual information, hearing information and tactile information which may be cognized by a user (driver).

The output 340 may include a display and a speaker, among other devices. The display may include at least one of a liquid crystal display (LCD), a thin film transistor-liquid crystal display (TFT LCD), an organic light-emitting diode (OLED), a flexible display, a 3D display, a transparent display, a head-up display (HUD) and a touch screen.

Figure 2:
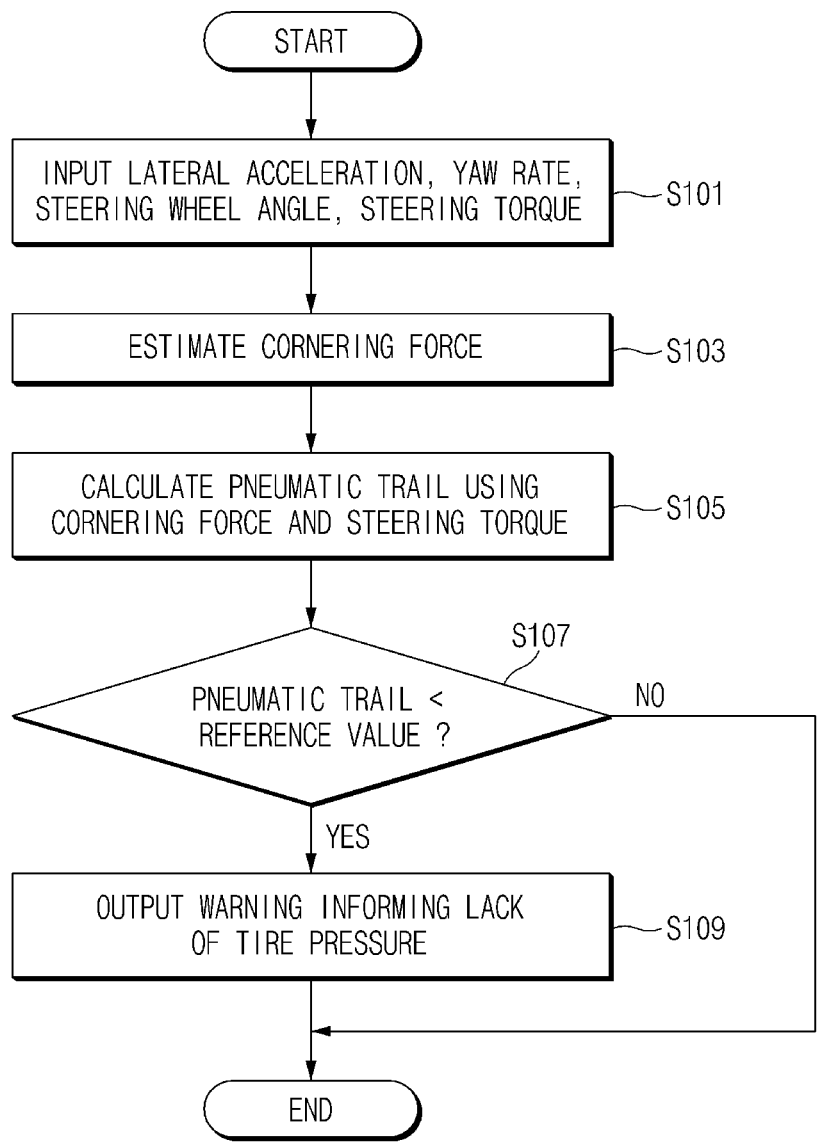
FIG. 2 is a flow chart illustrating a method for monitoring a tire pressure of a vehicle according to an exemplary embodiment of the present disclosure.

FIG. 2 is a flow chart illustrating a method for monitoring a tire pressure of a vehicle according to an exemplary embodiment of the present disclosure.

First, the apparatus 300 for monitoring a tire pressure receives the inertial information of the vehicle from the vehicle dynamic control 100 and receives the steering information from the steering apparatus 200 (S101). The inertial information of the vehicle includes the lateral acceleration and the yaw rate, and the steering information includes the steering wheel angle and the steering torque.

The cornering force estimator 310 of the apparatus 300 for monitoring a tire pressure estimates the cornering force of the tire using the lateral acceleration, the yaw rate and the steering wheel angle (S103).

The pneumatic trail calculator 320 of the apparatus 300 for monitoring a tire pressure calculates the pneumatic trail using the cornering force and the steering torque estimated by the cornering force estimator 310 (S105).

The tire pressure checker 330 of the apparatus 300 for monitoring a tire pressure confirms whether the calculated pneumatic trail is less than the reference value (S107). Here, the reference value is the pneumatic trail when it is a reference tire pressure.

The tire pressure checker 330 determines the tire pressure to be insufficient when the pneumatic trail is less than the reference value and outputs a warning informing the lack of the tire pressure to the output 340 (S109).

The tire pressure checker 330 determines the tire pressure to be normal when the pneumatic trail is equal to or greater than the reference value.

According to the exemplary embodiments of the present disclosure, it is possible to monitor the tire pressure using the sensor information from the motor driven power steering (MDPS) and the vehicle dynamic control (VDC). As described above, according to the exemplary embodiment of the present disclosure, it is possible to configure the apparatus for monitoring a tire pressure without additional sensors by using the motor driven power steering (MDPS) and the vehicle dynamic control (VDC), which are already installed in the vehicle.

The existing apparatus for monitoring a tire pressure requires disassembling the tire to replace the battery every 60,000 km. According to the exemplary embodiment of the present disclosure, the additional sensor is not required and therefore there is no need to replace the sensor or battery.

Although the preferred embodiments and application examples of the present disclosure have been disclosed for illustrative purposes, those skilled in the art will appreciate that the present disclosure is not limited to specific embodiments and application examples and various modifications, additions and substitutions are possible, without departing from the scope and spirit of the disclosure as disclosed in the accompanying claims. Accordingly, such modifications, additions and substitutions should also be understood to fall within the scope of the present disclosure.

What is claimed is:

1. An apparatus for monitoring a tire pressure of a vehicle, comprising: a cornering force estimator configured to estimate a cornering force of a tire using a lateral acceleration and a yaw rate of the vehicle which are measured by a sensor installed in a vehicle dynamic control system, and a steering wheel angle which is measured by a sensor installed in a steering apparatus:
   a pneumatic trail calculator configured to calculate a pneumatic trail using the cornering force and a steering torque which is measured by a sensor installed in the steering apparatus; and
   a tire pressure checker configured to determine whether the tire pressure is insufficient based on the pneumatic trail calculated by the pneumatic trail calculator; and
   an output configured to output a warning informing of an insufficient tire pressure,
   wherein the pneumatic trail calculator calculates the pneumatic trail by using the cornering force, an aligning moment and a mechanical trail which is generated by a suspension geometry including a caster angle, and
   wherein the aligning moment is calculated by using the steering torque and a jacking torque which is determined by the suspension geometry.

2. The apparatus according to claim 1, wherein the tire pressure checker determines the tire pressure to be insufficient when the calculated pneumatic trail is less than a reference value.

3. The apparatus according to claim 2, wherein the reference value is a pneumatic trail when it is a reference tire pressure.

4. A method for monitoring a tire pressure of a vehicle, comprising: estimating a cornering force of a tire using a lateral acceleration and a yaw rate of the vehicle which are measured by a sensor installed in a vehicle dynamic control system, and a steering wheel angle which is measured by a sensor installed in a steering apparatus;
   calculating a pneumatic trail using the cornering force and a steering torque which is measured by a sensor installed in the steering apparatus; and
   determining whether the tire pressure is insufficient based on the pneumatic trail calculated by the pneumatic trail calculator and outputting a warning informing of an insufficient tire pressure,
   wherein the step of calculating the pneumatic trail calculates the pneumatic trail by using the cornering force, an aligning moment and a mechanical trail which is generated by a suspension geometry including a caster angle, and
   wherein the aligning moment is calculated by using the steering torque and a jacking torque which is determined by the suspension geometry.

5. The method according to claim 4, wherein the determining whether the tire pressure is insufficient includes:
   confirming whether the calculated pneumatic trail is less than a reference value; and determining the tire pressure to be insufficient when the calculated pneumatic trail is less than the reference value.

6. The method according to claim 5, wherein the determining whether the tire pressure is insufficient further includes determining the tire pressure to be normal when the calculated pneumatic trail is equal to or more than the reference value.

7. The method according to claim 5, wherein the reference value is a pneumatic trail when it is a reference tire pressure.

* * * * *